Figure 1:
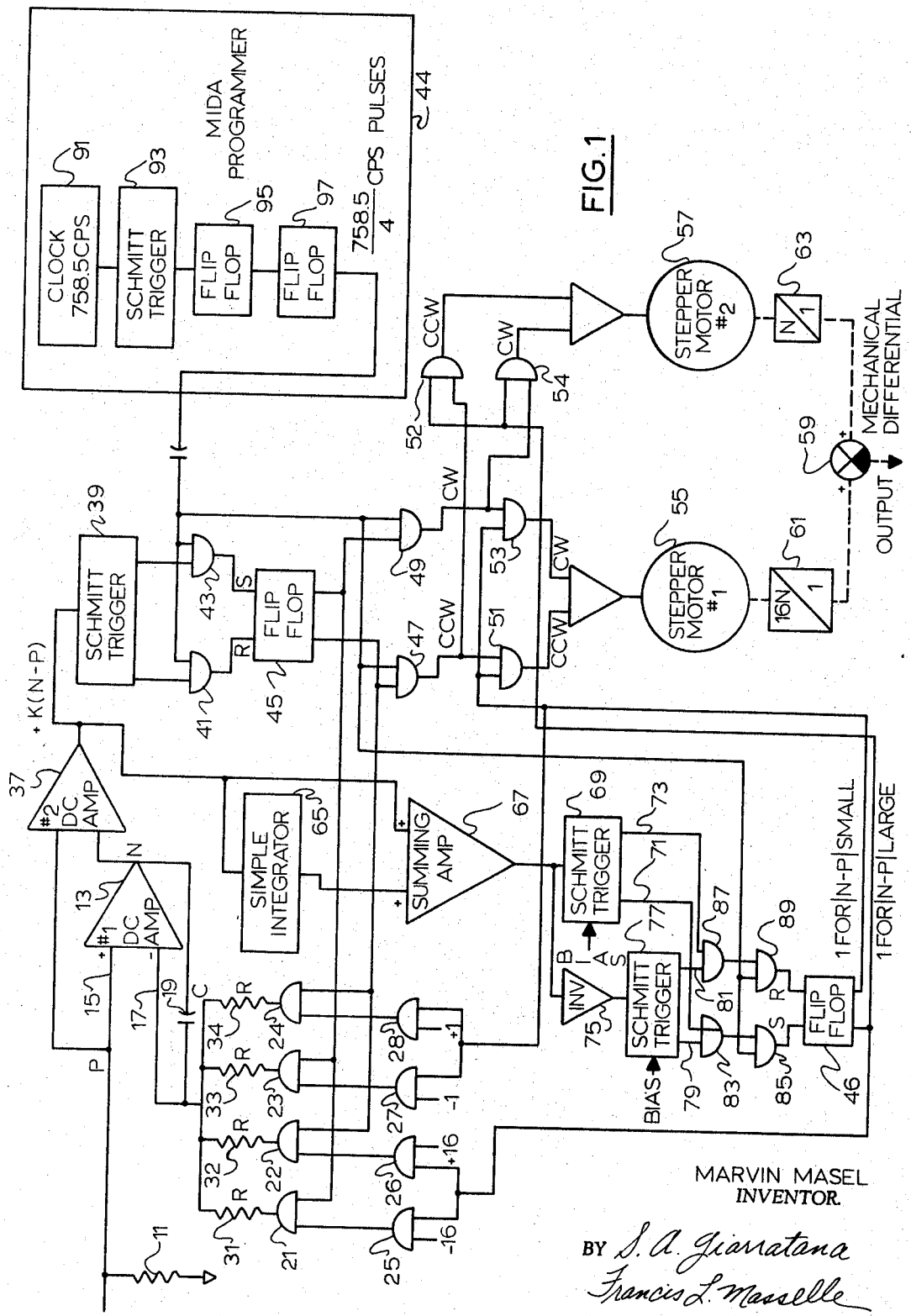

June 27, 1967 M. MASEL 3,328,568
ANALOG SIGNAL INTEGRATOR YIELDING DIGITAL OUTPUT
Filed July 19, 1963

MARVIN MASEL
INVENTOR.

BY S. A. Giavatana
Francis L. Masselle
ATTORNEYS

United States Patent Office 3,328,568
Patented June 27, 1967

3,328,568
ANALOG SIGNAL INTEGRATOR YIELDING
DIGITAL OUTPUT
Marvin Masel, West Englewood, N.J., assignor to General
Precision Inc., Little Falls, N.J., a corporation of Delaware
Filed July 19, 1963, Ser. No. 296,352
8 Claims. (Cl. 235—183)

This invention relates to integrators and more particularly to an integrator which is adapted to integrate an input signal in the form of a signal voltage or current and produce an output signal representing the computed integral in the form of an output shaft angular position.

The integrator of the present invention finds particular utility in integrating the output signal of an accelerometer to produce a signal representing velocity. An integrator used to perform this function is referred to as a "first integrator."

The integrator of the present invention is an improvement over the first integrators of the prior art because of is excellent slewing capability, which is the capability of responding to large accelerations. Moreover, the integrator of the present invention is highly accurate, is compact, and is of relatively low cost.

Accordingly, an object of the present invention is to provide an improved integrator.

Another object of the invention is to provide an integrator with an excellent slewing capability.

A further object of the present invention is to provide an integrator of the type described which is highly accurate.

A still further object of the present invention is to provide an integrator of the type described which is of relatively low cost.

These objects are accomplished in accordance with the present invention by means of an analog integrating circuit, which produces an output signal representing the integral of an applied input signal minus a reset voltage. The reset voltage can have any one of four values, one large positive voltage, one large negative voltage, one small positive voltage and one small negative voltage. The system selects the reset voltage to keep the output signal of the analog integrating circuit at a minimum and switches from one reset voltage to another as conditions require. The system will only switch between reset voltages simultaneously with clockpulses generated by a clockpulse generator and will never switch between clockpulses. Accordingly, a reset voltage will always be applied for a whole number of increments between clockpulses. By counting the number of increments that each different reset voltage is applied, and assigning a proper weight to the counts of increments when large and small reset voltages are applied, the integral of the input signal is accurately computed. Because reset voltages of both high and low magnitudes are used, the system has an excellent slewing capability without sacrificing accuracy or precision. The above described system is able to operate with very short increments of reset voltages or in other words has a high frequency band width thereby further increasing its accuracy.

Accordingly a still further object of the present invention is to provide an integrator of the type described with a high frequency band width.

Further objects and advantages of the present invention will become readily apparent as the following detailed description of the invention unfolds and when taken in conjunction with the single figure of the drawings, which is a block diagram of the system of the invention.

As shown in the drawings, the signal to be integrated is the voltage across a reference resistor 11. The current flowing through the reference resistor 11 could be an accelerometer output, in which case the voltage across the resistor 11 would represent acceleration. A D-C amplifier 13 is connected to amplify the difference between the signal voltage across the resistor 11, which is applied at an input 15 of the amplifier 13, and the signal voltage applied at an input 17 thereof. An integrating capacitor 19 connects the output of the amplifier 13 to the input 17. A series of eight AND gates 21 through 28 are used to select one of four voltages, plus one volt, minus one volt, plus 16 volts, or minus 16 volts to be used as a reset voltage. The outputs of the AND gates 21 through 24 are connected to the input 17 of the amplifier 13 through resistors 31 through 34, respectively. The resistances of the resistors 31 through 34 are equal. The selected reset voltage is applied through one of the AND gates 21 through 24 to an RC circuit comprising one of the resistors 31 through 34 and the integrating capacitor 19. If the input signal voltage across the resistor 11 is designated P, the output voltage of the amplifier 13 designated N, the reset voltage selected by the AND gates 21 through 28 designated Q, the capacitance of the capacitor 19 designated C, and the resistance of each of the resistors 31 through 34 designated R, then the following expression is true:

(1) $$N - P = \int \frac{P - Q}{RC} dt$$

A D-C amplifier 37 is connected to amplify the difference between the output signal voltage N of the amplifier 13 and the input signal voltage P. The output of the amplifier 37 will be proportional to N minus P and therefore will be proportional to the integral of P minus Q. The output signal of the amplifier 37 is applied to a Schmitt trigger circuit 39 which enables an AND gate 41 in response to a positive applied signal voltage and enables the AND gate 43 in response to a negative applied signal voltage. Pulses at a constant pulse frequency are applied from a clockpulse generator 44 to both of the AND gates 41 and 43 and will pass through whichever one of the AND gates 41 and 43 that is enabled to a flipflop 45. Pulses passing through the AND gate 41 will reset the flipflop 45 and pulses passing through the AND gate 43 will set the flipflop 45. If the flipflop 45 is already set when a pulse passes through the AND gate 41 or is already reset when a pulse passes through the AND gate 43, the flipflop 45 will remain in the state that it is in. Thus when the output signal of the amplifier 37 becomes positive the flipflop 45 will be reset and when the output signal of the amplifier 37 becomes negative the flipflop 45 will be set. When the output signal from the amplifier 37 changes polarity, the state of the flipflop 45 will reverse accordingly at the time of the next occurring output pulse from the clockpulse generator 44. When the flipflop 45 is in its reset state, it enables AND gates 22 and 24 and when the flipflop 45 is in its set state it enables the AND gates 21 and 23. By circuitry to be described below the AND gates 27 and 28 will both be enabled to pass the voltages minus one volt and plus one volt to the AND gates 23 and 24 respectively when the sum of the output signal voltage of the amplifier 37 and the integral of this signal voltage is small. When the sum of the output signal voltage of the amplifier 37 and the integral of this signal voltage is large, the AND gates 25 and 26 will be enabled to pass the voltages minus 16 volts and plus 16 volts to the AND gates 21 and 22 respectively. At all times either the AND gates 25 and 26 will be enabled or the AND gates 27 and 28 will be enabled, so that either the AND gates 21 and 22 will have plus and minus 16 volts, respectively, applied thereto or the AND gates 23 and 24 will have plus and minus one volt, respectively, applied thereto. Thus whenever the flipflop 45 is in its reset state, plus one volt will be applied through the AND gate 24 to the resistor 34 or plus 16 volts will be applied through the AND gate 22 to the resistor 32; and whenever the flipflop 45 is in its set state, minus one volt will be applied through the AND gate 23 to the resistor 33 or minus 16 volts will be applied through the AND gate 21 to the resistor 31. Accordingly the Q voltage will become plus one volt or plus 16 volts when the output of the amplifier 37 is positive and will become minus one volt or minus 16 volts when the output of the amplifier 37 is negative. Since the AND gates 21 through 24 are controlled by the flipflop 45, which will change state only at the time of a clockpulse, the Q voltage will change polarity only at the time of a clockpulse. The AND gates 25 through 28 are controlled by a flipflop 46. When the flipflop 46 is set, it enables the AND gates 25 and 26; and when the flipflop 46 is reset, it enables the AND gates 27 and 28. The state of the flipflop 46 is controlled in accordance with the magnitude of the sum of the output signal voltage of the amplifier 37 and the integral of this signal voltage by circuitry to be described below. This circuitry will only switch the flipflop from one state to another at the time of an output pulse from the clockpulse generator 44. Accordingly the Q voltage will only switch from plus or minus 16 volts to plus or minus one volt at the time of an output pulse from the clockpulse generator 44. Thus the Q voltage will switch from one of its four possible values to another at the time of an output pulse from the clockpulse generator. Thus the voltage Q will be one of its four possible values for a precise number of increments between output pulses of the clockpulse generator 44. It will be noted that whenever the output signal of the amplifier 37 is positive, the value of Q will be positive or will become positive upon the next occurring clockpulse; and whenever the output signal is negative, the value of Q will be negative or become negative on the next occurring clockpulse. Also the value of Q will have a 16 volt magnitude when the sum of the output signal of the amplifier 37 plus the integral thereof is large and will have a 1 volt magnitude when this sum is small. Since the output signal of the amplifier 37 represents the integral of P minus Q, the control of the value of Q in this manner will keep the value of the integral of P minus Q at a minimum. Hence the integral of Q will be an accurate measurement of the integral of P. Since the value of Q never changes between clockpulses but always remains at one of its values for a whole number of increments, the integral of Q and therefore the integral of P can be determined by counting the number of increments that it remains at each of its values and then subtracting the number of increments that it is at minus 16 volts from the number of increments that it is at plus 16 volts to provide a first difference, subtracting the number of increments it is at minus one volt from the number of increments that it is at plus one volt to provide a second difference, and adding the second difference to 16 times the first difference. Mathematically this operation can be expressed as follows:

(2) $\quad \int Q dt = (16A - 16B + C - D)K$ in which A is the number of increments that Q is at plus 16 volts, B is the number of increments that Q is at minus 16 volts, C is the number of increments that Q is at plus one volt, D is the number of increments that Q is at minus one volt, and K is a constant. When the flipflop 45 is in its reset state, it will enable an AND gate 47; and when the flipflop 45 is in its set state, it will enable an AND gate 49. The output pulses from the clockpulse generator 44 are applied to both the AND gates 47 and 49. When the AND gate 47 is enabled, it will pass the pulses from the clockpulse generator to AND gates 51 and 52; and when the AND gate 49 is enabled, it will pass the pulses from the clockpulse generator 44 to AND gates 53 and 54. The AND gates 51 and 53 will be enabled by the flipflop 46 whenever it is reset or in other words when the Q voltage is plus or minus one volt. The AND gates 52 and 54 will be enabled by the flipflop 46 whenever it is set or in other words when the Q voltage is plus or minus 16 volts. Thus the AND gates 47 and 51 will both be enabled and a clockpulse from the generator 44 can pass through the AND gate 47 and through the AND gate 51 only when the Q voltage is plus one volt. Thus the number of pulses passing through the AND gate 51 will equal the number of increments that the Q voltage is plus one volt. Each pulse passing through the AND gate 51 is applied to a stepper motor 55 and causes the stepper motor 55 to step one increment in a counter-clockwise direction. Thus the motor 55 will step one increment in a counter-clockwise direction for each increment that the Q voltage is plus one volt. The AND gates 49 and 53 will both be enabled and an output pulse from the clockpulse generator 44 can pass through the AND gate 49 and through the AND gate 53 to the stepper motor 55 only when the Q voltage is minus one volt. Thus the number of pulses passing through the AND gate 53 will equal the number of increments that the Q voltage is minus one volt. In response to each pulse passing through the AND gate 53 the stepper motor 55 steps one increment in the clockwise direction. Thus the stepper motor 55 will step a number of increments in the clockwise direction equal to the number of increments that the Q voltage is minus one volt. Therefore the stepper motor 55 will step to an angular position a number of increments removed from its starting position equal to the number of increments that the Q voltage has been plus one volt minus the number of increments that the Q voltage has been minus one volt. The AND gates 47 and 52 will both be enabled and a pulse from the clockpulse generator can pass through the AND gate 47 and the AND gate 52 only when the Q voltage is plus 16 volts. The AND gates 49 and 54 will both be enabled and a pulse from the clockpulse generator 44 can pass through the AND gates 49 and 54 only when the Q voltage is minus 16 volts. Thus the number of pulses passing through the AND gate 52 will equal the number of increments that the Q voltage is plus 16 volts and the number of pulses passing through the AND gate 54 will equal the number of increments that the Q voltage is minus 16 volts. The outputs of the AND gates 52 and 54 are fed to a stepper motor 57, which steps one increment in a counter-clockwise direction in response to each pulse from the AND gate 52 and steps one increment in the clockwise direction in response to each pulse from the AND gate 54. Thus the stepper motor 57 will step to an angular position a number of increments removed from its starting position equal to the number of increments that the Q voltage has been plus 16 volts minus the number of increments that the Q voltage has been minus 16 volts.

The output shaft of the stepper motor 55 is coupled to an input of a mechanical differential 59 through a speed reducing gear train 61, which has a 16 to 1 speed reduction ratio. The output shaft of the stepper motor 57 is coupled to another input shaft of the mechanical differential 59 through a gear train 63 which has a 1 to 1 ratio of input speed to output speed. The mechanical differential 59 operates to add the output from the stepper motor 55 with its speed reduced to the direct output from the stepper motor 57 to position its output shaft at an angular position equal to the sum of the angular position of the output shaft of the stepper motor 57 plus one-sixteenth of the angular position of the output shaft of the stepper motor 55. As a result, the output shaft of the differential 59 will be positioned at an angular position representing the integral of Q and therefore representing the integral of the input signal P.

To control the state of the flipflop 46, which controls whether the Q voltage is to be ±16 volts or ±1 volt, the output signal of the amplifier 37 is fed to an integrator 65 and to one input of a summing amplifier 67. The integrator 65 applies to another input of the summing amplifier 67 a signal voltage representing the integral of the output signal voltage of the amplifier 37. The summing amplifier 37 produces an output signal voltage representing the sum of the output signal voltage of the integrator 65 plus the output signal voltage of the amplifier 37, or in other words the sum of the output signal voltage of the amplifier 37 plus the integral thereof. This signal voltage is applied to a Schmitt trigger 69 which is biased so that it will produce an enabling signal on an output 71 only if the applied signal voltage of the summing amplifier 67 is positive and above a predetermined value. Otherwise the Schmitt trigger 69 produces an enabling signal on an output 73. The output signal voltage of the summing amplifier 67 is also applied to an inverter 75 which reverses the polarity of the signal voltage and applies it to a Schmitt trigger 77. The Schmitt trigger 77 is biased like the Schmitt trigger 69 to produce an enabling signal on an output 79 only when a positive signal voltage above a predetermined value is applied from the inverter 75. The predetermined value for the Schmitt trigger 77 is the same as that for the Schmitt trigger 69. When the voltage applied from the inverter 75 is not above the predetermined value or is negative, the Schmitt trigger 77 produces an enabling signal on an output 81. The outputs 71 and 79 from the Schmitt triggers 69 and 77 are applied through an OR gate 83 to an AND gate 85. The AND gate 85 will therefore be enabled by a signal on output 71 from the Schmitt trigger 69 when a positive signal is produced by the summing amplifier 67 above the predetermined value for the Schmitt trigger circuit 69. Similarly, the AND gate 85 will be enabled by a signal on output 79 from the Schmitt trigger 77 when the inverter 75 applies a positive signal to the Schmitt trigger 77 above this same predetermined value. Hence the AND gate 85 will be enabled by a signal on output 79 from the Schmitt trigger 77 when the summing amplifier 67 produces a negative output signal voltage having a magnitude greater than the predetermined value for the Schmitt triggers 69 and 77. Hence, the AND gate 85 will be enabled when the output signal voltage of the summing amplifier 67 is either plus or minus and has a magnitude greater than the predetermined value set in the triggers 77 and 69. An enabling signal produced on output 81 of the Schmitt trigger 77 is applied to an AND gate 87 and an enabling signal produced on output 73 by the Schmitt trigger 69 is also applied to the AND gate 87. When the AND gate 87 receives enabling signals from both output 81 of the Schmitt trigger 77 and output 73 of the Schmitt trigger 69, it will apply an enabling signal to an AND gate 89. Thus the AND gate 89 will be enabled when the magnitude of the output signal voltage of the summing amplifier 67 is not above the predetermined value set in the triggers 69 and 77. The clockpulses from the clockpulse generator 44 are applied to both the AND gates 85 and 89 and will pass through whichever one of the AND gates 85 and 89 is enabled to the flipflop 46. A clockpulse passing through the AND gate 85 will set the flip-flop 46 and a clockpulse passing through the AND gate 49 will reset the flipflop 46. If the flip-flop 46 is already set when a clockpulse passes through the AND gate 85 or is already reset when a clockpulse passes through the AND gate 89, the flipflop 46 will remain in the state that it is in. Thus the flipflop 46 will be set when the absolute value of the output signal voltage of the summing amplifier 67 rises above the predetermined value set in the Schmitt triggers 69 and 77, and will be reset when the absolute value of the output signal voltage of the summing amplifier 67 falls below this predetermined value. Accordingly, the flipflop 46 will be set when the magnitude of the sum of the output signal voltage of the amplifier 37 plus the integral thereof rises above a predetermined value and will be set when the magnitude of this sum falls below this predetermined value. Since the flip-flop 46 is set and reset by clockpulses, it will only switch states at the time of the clockpulses, so that the Q voltage which is controlled by the flipflop 46 will not change between clockpulses. The use of the integral of the output signal of the amplifier 37 added to the output signal of the amplifier 37 to determine the threshold of when the Q voltage should be ±1 volt or ±16 volts instead of just the output signal voltage of the amplifier 37 eliminates hangoff error during prolonged large acceleration or deceleration.

The clockpulse generator 44 comprises a 758.5 cycles per second oscillator 91, the output of which is fed to a Schmitt trigger 93, which produces output pulses at a pulse frequency of 758.5 cycles per second. The pulse output of the Schmitt trigger 93 is fed to a frequency divider comprising two flipflops 95 and 97 which together divide the pulse frequency by four to produce an output pulse frequency of 758.5/4 cycles per second.

Because the reset voltage for the integrator may be either 16 volts or one volt, the integrator has an excellent slewing capability without sacrificing accuracy. In the specific embodiment the system operates with 758.5/4 increments of reset voltage per second. An electronic system can be used instead of the stepper motor to count the increments of reset voltage and with an electronic counting system the integrator could operate with several thousand increments of reset voltage per second. Many other modifications may be made to the above-described specific embodiment without departing from the spirit and scope of the invention, which is defined in the appended claims.

What is claimed is:

1. An integrator comprising an analog integrating means including an integrating capacitor and D-C amplifier means having a pair of inputs and an output coupled to one of said inputs by said capacitor, said integrating means being adapted to produce an output signal representing the integral of a signal applied to the other of said inputs minus the signal applied to said one input, a bistable means having first and second inputs and being operable to be reset in response to a pulse applied to a first input and operable to be set in response to a pulse applied to a second input, a clockpulse generator generating pulses at a constant pulse frequency, means to apply the output pulses of said clockpulse generator to the first input of said bistable means when a predetermined function of the output signal of said integrating means exceeds a reference value and to apply the output pulses of said clockpulse generator to the second input of said bistable means when said predetermined function is less than said reference value, means to apply a signal of a first predetermined magnitude to said one input of said integrating means as long as said bistable means is in its reset state and to apply a signal of a second predetermined magnitude to said one input of said integrating means for as long as said bistable means is in its set state, and means to count the number of intervals between output pulses of said clockpulse generator that said bistable means is in its reset state and to count the number of intervals between clockpulses that said bistable means is in its set state.

2. An integrator comprising an analog integrating means including an integrating capacitor and D-C amplifier means having a pair of inputs and an output coupled to one of said inputs by said capacitor, said integrating means being adapted to produce an output signal representing the integral of a signal applied to the other of said inputs minus the signal applied to said one input, a bistable means having first and second inputs and being operable to be set in response to the pulse applied to a first input and to be reset in response to a pulse applied to a second input, a clockpulse generator generating pulses at a constant pulse frequency, means to apply the output pulses of said clockpulse generator to the first input of said bistable means when the output signal of said integrating means is on one polarity and to apply the output pulses of said clockpulse generator to the second input of said bistable means when the output signal of said integrating means is of the opposite polarity, means for applying a signal of a predetermined magnitude and of a first polarity to said one input of said integrating means for as long as said flipflop is in its reset state and for applying a signal of a predetermined magnitude and of a second polarity to said one input of said integrating means for as long as said flipflop is in its set state, and means to count the number of intervals between output pulses of said clockpulse generator that said bistable means is in its reset state and to count the number of intervals between clockpulses that said bistable means is in its set state.

3. An integrator comprising an analog integrating means including an integrating capacitor and D-C amplifier means having a pair of inputs and an output coupled to one of said inputs by said capacitor, said integrating means being adapted for producing an output signal representing the integral of a signal applied to the other of said inputs minus the signal applied to said one input thereof, first and second bistable means each having first and second inputs and being operable to be set in response to a pulse applied to a first input thereof and operable to be reset in response to a pulse applied to a second input thereof, a clockpulse generator generating pulses at a constant pulse frequency, means to apply the output pulses of said clockpulse generator to the first input of said first bistable means when the output signal of said integrating means is of one polarity and to apply the output pulses of said clockpulse generator to the second input of said first bistable means when the output signal of said integrating means is of the opposite polarity, means to apply the output pulses of said clockpulse generator to the first input of said second bistable means when a predetermined function of the output signal of said integrating means has a magnitude exceeding a reference value and to apply the output pulses of said clockpulse generator to the second input of said second bistable means when said predetermined function has a magnitude less than said reference value, and means to apply a signal of a first polarity and of a first predetermined magnitude to said one input of said integrating means for as long as said first and second bistable means are both in their reset states, to apply a signal of a second polarity and of said first predetermined magnitude to said one input of said integrating means for as long as said first bistable means is in its set state and said second bistable means is in its reset state, to apply a signal of said first polarity and of a second predetermined magnitude to the second input of said integrating means for as long as said first bistable means is in its reset state and said second bistable means is in its set state, and to apply a signal of said second polarity and said second predetermined magnitude to said one input of said integrating means for as long as both said first and second bistable means are in their set states.

4. An integrator as recited in claim 3 wherein there is provided means to count the number of intervals between pulses generated by said clockpulse generator that both said first and second bistable means are in their reset states, to count the number of intervals between the output pulses of said clockpulse generator that said first bistable means is in its set state and said second bistable means is in its reset state, and to count the number of intervals between the output pulses of said clockpulse generator that both said first and second bistable means are in their set states.

5. An integrator comprising an analog integrating means including an integrating capacitor and D-C amplifier means having a pair of inputs and an output coupled to one of said inputs by said capacitor, said integrating means being adapted to produce an output signal representing the integral of a signal voltage applied to the other of said inputs minus the signal voltage applied to said one input, means generating a first signal voltage having a first predetermined magnitude and a first polarity, a second signal voltage having said first predetermined magnitude and a second polarity, a third signal voltage having a second predetermined magnitude and said first polarity, and a fourth signal voltage having said second predetermined magnitude and said second polarity, means to select one of said first, second, third and fourth signal voltages and apply such signal voltage to said one input of said integrating means and to change the selection of said first, second, third and fourth signal voltages to minimize the output signal voltage of said integrating means only after the preceding selected signal voltage has been applied to said one input for a whole number of increments of a predetermined length.

6. An integrator as recited in claim 5 wherein there is provided means to count the number of said increments that each of said first, second, third and fourth signal voltages are applied to the second input of said analog integrating means.

7. An integrator comprising:
   analog integration means including an integrating capacitor and D-C amplifier means having a pair of inputs and an output coupled to one of said inputs by said capacitor;
   a first and second bistable means each having a first and a second input and being operable to be set in response to a pulse applied to a first input thereof and operable to be reset in response to a pulse applied to a second input thereof;
   a clockpulse generator generating pulses at a constant frequency;
   means, including a pair of AND gates selectively, alternately opened and closed in response to signals of respective polarities from the output of said amplifier means, to apply the output pulses of said clockpulse generator to the first input of said first bistable means when the output signal of said integrating means is of one polarity and to apply the output pulses of said clock generator to the second input of said bistable means when the output signal of said integrating means is of the opposite polarity;
   means, including a summing amplifier and an integrator, to apply the output pulses of said clockpulse generator to the first input of said second bistable means when the sum of the output of said amplifier means and the integral of said output exceeds in magnitude a reference value and to apply the output pulses of said clockpulse generator to the second input of said second bistable means when said sum has a magnitude less than said reference value;
   respective sources of a comparatively high potential of both polarities and of a comparatively low potential of both polarities; and
   means, including a matrix of AND gates coupled between said potential sources and said one input of the amplifier means and connected to receive enabling signals from said first and second bistable means so as selectively to apply respective ones of said potentials to said one input of the amplifier means.

8. An integrator according to claim 7, additionally comprising further D-C amplifier means having a pair of inputs and an output, each of said amplifier means being adapted to amplify the difference between signals applied to the pair of inputs thereof, said two amplifier means being connected with the output of the first mentioned feeding one of the inputs of the said further amplifier means, other input of the second amplifier means being connected in common with the other input of the first mentioned amplifier means to receive an input signal to be integrated, the output of the second amplifier constituting the output of the amplifier means.

References Cited

UNITED STATES PATENTS

| | | | |
|---|---|---|---|
| 2,817,704 | 12/1957 | Huntley | 340—347 |
| 2,885,662 | 5/1959 | Hansen | 340—347 |
| 3,042,911 | 7/1962 | Paradise et al. | 340—347 |
| 3,204,466 | 9/1965 | Henderson | 340—347 |

MALCOLM A. MORRISON, *Primary Examiner.*